United States Patent
Joson

[11] Patent Number: 6,153,298
[45] Date of Patent: Nov. 28, 2000

[54] THERMAL LAMINATING FILM FOR DIGITAL PRINTED SUBSTRATES

[75] Inventor: Luis Keyser Joson, Lincolnwood, Ill.

[73] Assignee: General Binding Corp., Northbrook, Ill.

[21] Appl. No.: 09/072,884

[22] Filed: May 5, 1998

[51] Int. Cl.[7] .................................................. B32B 15/04
[52] U.S. Cl. ........................ 428/349; 428/340; 428/474.4
[58] Field of Search ..................... 428/516, 349, 428/335, 340, 474.4; 156/84, 85, 100, 103, 164

[56] References Cited

U.S. PATENT DOCUMENTS

| | | | |
|---|---|---|---|
| 4,623,587 | 11/1986 | Ito et al. ................................... | 428/335 |
| 4,878,974 | 11/1989 | Kagawa ..................................... | 156/85 |
| 5,626,969 | 5/1997 | Joson ..................................... | 428/474.4 |
| 5,939,471 | 8/1999 | Watanabe et al. ...................... | 523/334 |
| 6,028,028 | 2/2000 | Nitta ......................................... | 503/200 |

*Primary Examiner*—Merrick Dixon
*Attorney, Agent, or Firm*—Hill & Simpson

[57] ABSTRACT

A non-blocking thermal laminating film is provided including a thermoplastic polymer base layer and a thermal laminating layer including an ethylene vinyl acetate copolymer containing 28%–40% by weight vinyl acetate units and an anti-blocking amount of an anti-blocking agent. Preferred anti-blocking agents include low molecular weight polyethylene and EVA copolymers with 10% by weight or less vinyl acetate content. The thermal lamination films are specially adapted for use on modern digitally printed substrates including those printed with glycol-based inks, 100% solids inks and siliconized printed surfaces.

10 Claims, 2 Drawing Sheets

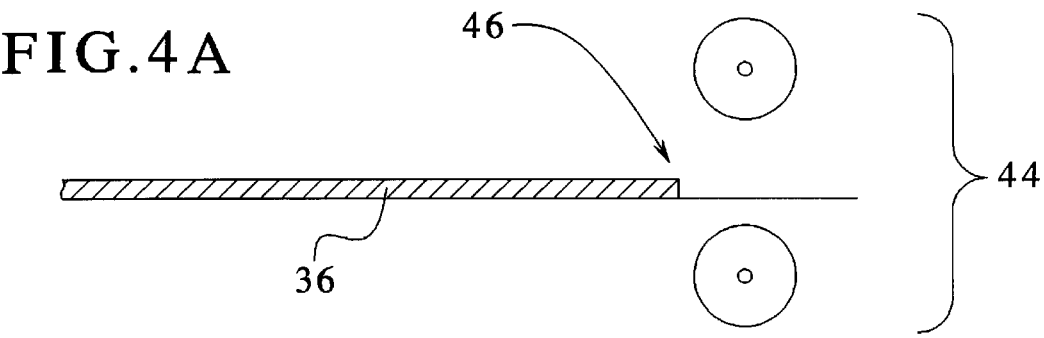
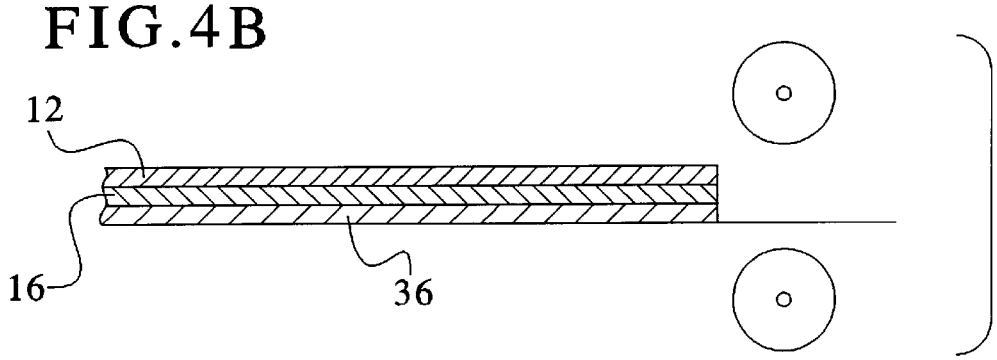
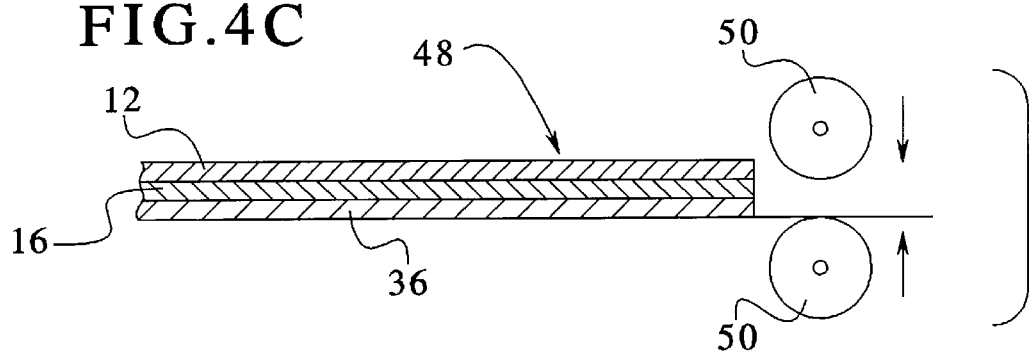
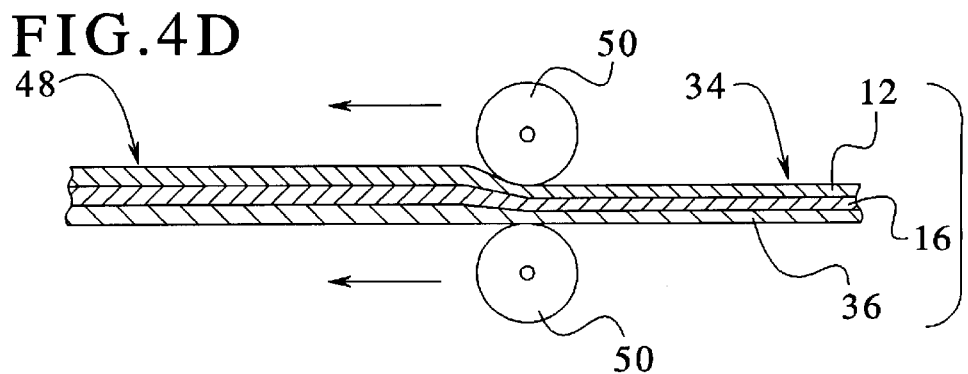

THERMAL LAMINATING FILM FOR DIGITAL PRINTED SUBSTRATES

BACKGROUND OF THE INVENTION

The present invention generally relates to new and improved thermal lamination films and methods for protecting and enhancing the appearance of printed substrates. More particularly, it relates to new and improved thermal laminating films specially created for use with newer printed substrates prepared using modern digital printing methods and equipment.

Thermal laminating materials and methods are known for protecting printed substrates by adhering a protective thermoplastic polymer cover film or sheet to one or both of the major surfaces of a printed substrate. Thermal film lamination provides immediate benefits to printed materials—most notably, an attractive look and polished feel. With thermal lamination, printed materials enjoy greater durability. Unlike UV or other coatings, thermal lamination provides protection against scratching, fading and smudging. The life of the printed materials is extended in a number of ways because thermal lamination makes paper more tear resistant and protects inks on printed substrates.

Unlike other finishes, thermal lamination is a very safe and waste free process. It does not emit harmful volatiles and other substances into the atmosphere. Accordingly, thermal lamination is a significant breakthrough in finishing practices and contributes greatly toward preserving the environment. Earlier, less productive solvent-and water-based systems are now being changed over to thermal lamination. Thermal lamination is considered by many in the graphic arts community to be the finish of choice. With its high-luster look and luxurious feel, a laminated product communicates quality and creates a favorable impression with the consuming public. There are a wide variety of laminates to choose from, i.e., clear, delustered, satin finish, and glueable-stampable, to name but a few. Thermal lamination can add value to a wide range of printed materials. Illustrative applications may include: book covers, magazines, annual reports, speciality packaging, posters, photographs, gift bags, calendars, maps, menus, video boxes and trading cards, to name but a few.

Advances in the printing field, especially in digital printing resulting from the explosion in personal computers and desk top publishing, have created new problems for thermal laminating methods. More particularly, with the development of digital printing, new ink technologies are being developed. Newer inks do not dry, but instead are absorbed into the paper surface. Some glycol formulated inks do not cross-link and harden. Instead, solvent evaporates from the ink formulation so that the ink thickens but remains flexible or soft. Successfully thermal laminating these printed surfaces is difficult. Adhesion of a thermal lamination film to these printed ink surfaces is more difficult do to poor adhesion to these inks and decreased substrate surface area available for bonding.

Another recent development has been the introduction of solid inks comprising a pigment dispersed in a resin, such as polystyrene, at 100% solids. These inks may be used in colored electrostatic printer types. Heat is used to adhere the ink or fuse toner to the paper, to fuse the ink together. These solid inks are tacky when heated and, for this reason, the surface of the ink is typically sprayed with a silicone compound to prevent hot ink from sticking to rollers or other parts of printing equipment. The silicone coating makes adhesion of thermal lamination films to these printed products especially difficult.

Thermal laminating films include the base, public side protective layer, usually a clear thermoplastic polymer material, and a thermal laminating layer or adhesive layer on one side of the base layer. A thermal laminating film for newer digital printed substrates requires the use of adhesives that can be activated at lower temperatures. These adhesives must have a low viscosity, when activated, and high polarity to allow the adhesive to adhere to different ink formulations and different paper substrates, whether they are natural or synthetic.

Typical adhesives for thermal laminating films have included ethylene vinyl acetate copolymers. Usually these copolymers contain from 10 to 18% by weight of vinyl acetate units. At these lower levels of vinyl acetate content, satisfactory adhesion and performance in thermal lamination is difficult to achieve with the newer printed substrates. At higher vinyl acetate levels of about 28% or higher the thermal lamination film tends to be self welding or to block. Blocking or sticking of the film to itself when it is wound upon a roll is a very serious problem in commercial thermal lamination operations. The blocking tendency has been observed starting at about 18% by weight vinyl acetate content and the problem is only exacerbated by increasing the vinyl acetate content more than 18%. At higher levels of vinyl acetate of up to 28% or higher it is difficult to produce the films and is extremely difficult to store them. The films cause sticking to chilled casting rolls which presents a major production problem. Moreover, the edges of the rolled up film tend to fuse making unrolling and use of the material difficult, if not impossible. When large rolls are slit into narrower rolls for use, the slit rolls tend to block and stick, rendering them useless or difficult to use in commercial thermal lamination applications. Accordingly, new and improved thermal lamination films are needed which exhibit satisfactory performance and adhesion to newer digital printing substrates which can simultaneously overcome serious production and storing disadvantages previously encountered with thermal laminating films of this type.

SUMMARY OF THE INVENTION

Unexpectedly, in view of the foregoing, it has now been discovered that a thermally laminatable multilayered film may be provided which exhibits excellent thermal lamination properties on a variety of printed substrates including newer ink substrates obtained by more modern digital printing methods. The new and improved thermal laminating film comprises a base layer of a thermoplastic polymer sheet material having a surface. A thermal laminating layer is disposed on the surface which comprises from about 60 to about 90% by weight of an ethylene vinyl acetate copolymer containing from about 28 to about 40% by weight of vinyl acetate units. The thermal laminating layer additionally comprises an effective amount of an anti-blocking agent modifier which is effective, when the thermal laminating film is wound onto a roll, to prevent the thermal laminating film from sticking to roller surfaces, from fusing along an edge portion thereof, or from blocking upon splitting.

In an embodiment, the thermal laminating layer comprises from about 5 to about 40% by weight of the anti-blocking agent.

In an embodiment, the anti-blocking agent comprises a low molecular weight polyethylene having a melt index of about 30.

In an embodiment, the anti-blocking agent comprises an additional ethylene vinyl acetate copolymer having a relatively low vinyl acetate content of 10% by weight or less.

In an embodiment, the thermal laminating film further comprises an ultraviolet absorber.

In an embodiment, a new and improved method for making a thermal laminating film is provided comprising the steps of: providing a thermoplastic polymer sheet base layer having a surface; and thereafter, applying a thermal laminating layer to the surface. The thermal laminating layer comprises from about 60 to about 90% by weight of an ethylene vinyl acetate copolymer containing from about 28 to about 40% by weight vinyl acetate units and from about 5% to about 40% by weight of an anti-blocking agent.

In an embodiment of the method, the thermal laminating layer is applied onto the surface of the thermoplastic sheet base layer by extrusion coating methods.

In an embodiment, the overall thermal laminating film may have a total thickness of from about 15 to about 300 microns.

In an embodiment, a new and improved method for making the thermal lamination films is performed at lower temperatures than commercially employed such that unwanted thermal history defects in the thermal lamination films can be dramatically reduced or eliminated.

The new and improved thermal laminating films provided in accordance with an embodiment of the invention, may be employed in thermal lamination equipment to provide new and improved thermal laminate assemblies. In accordance with this aspect of the invention, new and improved thermal laminate assemblies are provided comprising: a printed substrate, including a surface with printed ink disposed imagewise on the surface. A protective thermoplastic polymer layer is thermally laminated to the printed surface with a thermal laminating layer disposed between the protective layer and the surface. The thermal laminating layer comprises from about 60 to about 90% by weight of an ethylene vinyl acetate copolymer containing from about 28% to about 40% by weight of vinyl acetate units and from about 5 to about 40% by weight of an anti-blocking agent.

In an embodiment, a new and improved method for making a thermal laminate assembly is provided comprising the steps of: preparing a printed substrate to be laminated comprising a substrate having a surface with printed ink disposed imagewise on the surface. A thermal laminating film is prepared comprising a protective thermoplastic polymer planar base layer having a surface and a thermal laminating layer disposed on the surface. The thermal laminating layer comprises from about 60 to about 90% by weight of ethylene vinyl acetate copolymer containing form about 28 to about 40% by weight of vinyl acetate units and from about 5 to about 40% by weight of an anti-blocking agent. The printed substrate and thermal laminating film are moved relative to each other so that the printed substrate and thermal laminating film are disposed in a registering overlying relationship so that the thermal laminating layer is disposed on the printed surface of the substrate to form a pre-assembly. Thereafter, the pre-assembly is exposed to conditions of elevated temperature and pressure to effectively bond the thermal laminating film to the surface of the printed substrate to provide the finished thermal laminate assembly product.

A major advantage provided by the present invention is that multi-layered thermal laminating films for use with glycol formulated inks or siliconized printed materials is provided.

Another major advantage, provided by the present invention, is that multi-layered thermal laminating films are provided including a thermal laminating film layer based on ethylene vinyl acetate having a relatively high vinyl acetate content of above about 28% which does not stick to rollers, fuse along the ends or block upon slitting.

A further advantage provided by the present invention is that new and improved thermal laminating films including a polycarbonate base layer which may be prepared and laminated at temperatures below 200° F. to provide a polycarbonate thermal lamination assembly substantially free from heat distortion anomalies.

Other objects and advantages provided by the present invention will become apparent from the following Detailed Description of the Invention taken in conjunction with the Drawings, in which:

BRIEF DESCRIPTION OF THE DRAWINGS

FIGS. 4a–4d are elevated cross-sectional schematic views showing a sequence of steps employed in a method for making the thermal laminate assembly shown in FIG. 3 including providing a printed substrate as in FIG. 4a; positioning a thermal laminating film thereon to form a pre-assembly as in FIG. 4b; preparing the assembly for application of heat and pressure as in FIG. 4c and applying heat and pressure to the assembly as in FIG. 4d to provide a thermal laminate product.

DETAILED DESCRIPTION OF THE PREFERRED EMBODIMENT

Figure 1:
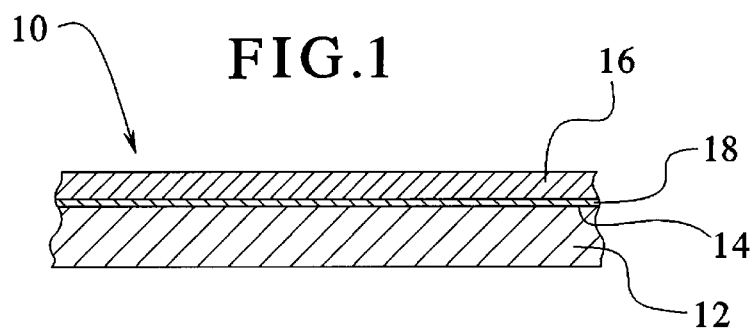
FIG. 1 is an elevated cross-sectional view of a new and improved thermal laminating film in accordance with the present invention.

Referring now to FIG. 1, a new and improved thermal laminating film in accordance with an embodiment of the invention generally referred to by reference numeral 10, is shown. Thermal laminating film 10 comprises a base layer 12 of a thermoplastic polymer sheet material having a surface 14 and a thermal laminating layer 16 disposed on surface 14.

In accordance with the preferred embodiment, depicted in FIG. 1, surface 14 is pre-treated by a surface treatment including a corona treatment and application of a primer 18, as shown.

In accordance with this embodiment, the thermal laminating layer 16 comprises from about 60 to about 90% by weight of an ethylene vinyl acetate copolymer containing from about 28 to about 40% by weight of vinyl acetate units and an amount of an anti-blocking agent which is effective, when the thermal laminating film 10 is wound on a roll to prevent the thermal laminating film 10 from sticking to roller surfaces, from fusing along an edge portion thereof or from blocking upon slitting.

The base layer may comprise any suitable thermoplastic polymer sheet material useful for thermal lamination applications. Preferably, the thermoplastic polymer sheet material is translucent or especially preferably transparent and possesses surface characteristics and other physical properties such as flexibility, durability, hardness, scratch resistance and the like, for protecting a printed surface to which the thermal laminating film may be laminated. Illustrative thermoplastic polymer sheet materials include oriented polypropylene, non-oriented polypropylene, polyesters, polyamides, polyvinyl chloride and polycarbonates.

In accordance with the preferred embodiment, the thermal laminating layer 16 comprises from about 5 to about 40% by weight of the anti-blocking agent. A preferred anti-blocking agent comprises a low molecular weight polyethylene having a melt index of about 30. Another anti-blocking agent which may be used in the thermal laminating layer comprises an ethylene vinyl acetate copolymer having a vinyl acetate content of about 10% by weight or less.

As depicted in FIG. 1, thermal laminating film 10 preferably has a total film thickness, dimension a, of from about 15 to about 300 microns. Polymer sheet base layer 12 may have a layer thickness of from about 0.001 to about 0.010 inches. The thermal laminating layer 16 may have a thickness of from about 0.0003 to about 0.005 inches.

In accordance with the preferred embodiment, thermal laminating layer 16 additionally comprises ultraviolet absorber and may comprise any other additives conventionally used by those skilled in this art.

Figure 2:
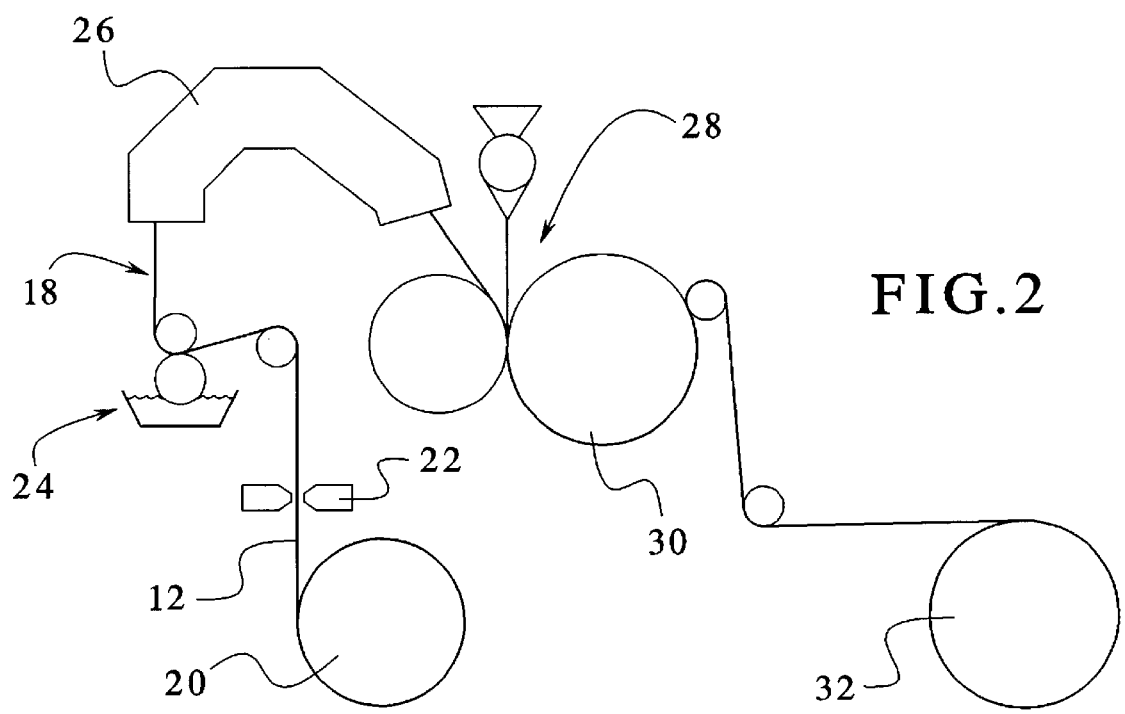
FIG. 2 is an elevated cross-sectional schematic view of a method for making the new and improved thermal lamination film of the present invention.

Referring now to FIG. 2, the new and improved method for making thermal laminating film 10, is shown. As depicted in FIG. 2, a continuous supply of thermoplastic polymer sheet material 12 rolled on a roll 20 is provided at the left hand end of the manufacturing line, as shown. The pre-formed polymer sheet material 12 first passes through a corona treatment station 22 wherein the surface 14 of the thermoplastic polymer 12 intended to receive the thermal laminating layer 16 is corona treated in a corona treating apparatus commercially available from Corona Design, Garland, Texas, at a setting of at least about 45 dynes.

The corona treated polymer sheet 12 then passes through a primer coating station 24 where a very thin primer coating layer 18 of a polyethylene amine is applied onto the corona treated surface. The polyethylene amine primer is coated in the priming station 24 at a rate sufficient to provide about 2 pounds wet primer per ream of thermoplastic polymer sheet. Thereafter, the primer coating 18 is dried in a drying station 26 at a temperature of about 150 to 200° F.

Thereafter, the primed, corona treated thermoplastic polymer sheet 12 is fed through an extrusion coating apparatus 28 to apply the thermal laminating layer 16 onto the treated surface 14 to form the thermal laminating film 10. Extrusion coating is performed using modified, commercially available extrusion coating equipment 28 available from Black and Clawson, Fulton, N.Y. The composition of the thermal laminating layer is mixed in the extrusion coating machine 28 by combining a polymer A comprising from about 60 to 90% by weight of ethylene vinyl acetate copolymer containing from about 28 to about 40% by weight of vinyl acetate units with an effective amount of an anti-blocking agent polymer B. The composition is admixed in the extrusion coater and an ultraviolet absorber or other additives may be added at this time, as well. Typically, the anti-blocking agent polymer B is added in an amount of from about 5 to about 40% by weight based on the weight of the overall composition. Preferably, the anti-blocking agent comprises a low molecular weight polyethylene having a melt index of about 30. The anti-blocking agent may also comprise an ethylene vinyl acetate copolymer having a vinyl acetate content of 10% by weight or less. The ultraviolet absorber may be added to the composition neat, but preferably will be added as a premixed resin dispersion of the ultraviolet absorber in a premixed pre-wetted form.

The ethylene vinyl acetate polymer A may have a weight average molecular weight of from about 500 to about 5,000,000. The anti-blocking agent useful as polymer B typically has a weight average molecular weight of from about 200 to about 500,000. These materials are abundantly available from commercial sources such as Du Pont and AT Plastics (Canada). The low molecular weight polyethylene anti-blocking agent is available from a number of sources. Preferably, the ultraviolet absorbers are added to the extrusion coater in pre-compounded form and preferably as a mixture of about 1:3 w/w ratio of Tinuvin® and 16% EVA. Tinuvin® is available from Ciba-Geigy®.

The extrusion equipment 28 is typically set at a die temperature of about 425°–450° F. and the thermoplastic polymer sheet is fed through the extrusion coater at a line sheet feeding rate of from about 300 to about 600 feet per minute, depending on the thickness of the adhesive. As the thermal lamination layer 16 is applied to the primed and corona treated surface 14 of the thermoplastic polymer substrate 12, both the substrate 12 and the thermal laminating layer 16 are at heated or elevated temperatures and the assembled thermal laminating film 10 is passed through chilled rollers 30 at a pressure of about 35 pounds per lineal inch to cool the thermal laminating film 10 and securely bond the thermal laminating layer 16 to the polymer substrate layer 12. After cooling, the finished thermal laminating film 10 is wound up on a take up roller 32, as shown in FIG. 2.

A major advantage provided by the present invention is that although the thermal laminating film includes a thermal laminating layer based on an ethylene vinyl acetate copolymer having a relatively high vinyl acetate content, when the film is taken up on the take up roller 32, sticking, blocking and fusing phenomenon previously associated with a high vinyl acetate EVA film is satisfactorily avoided. The rolled thermal laminating film 10 can be stored and then later used in commercial laminating equipment to provide new and improved thermal laminating assemblies.

Figure 3:
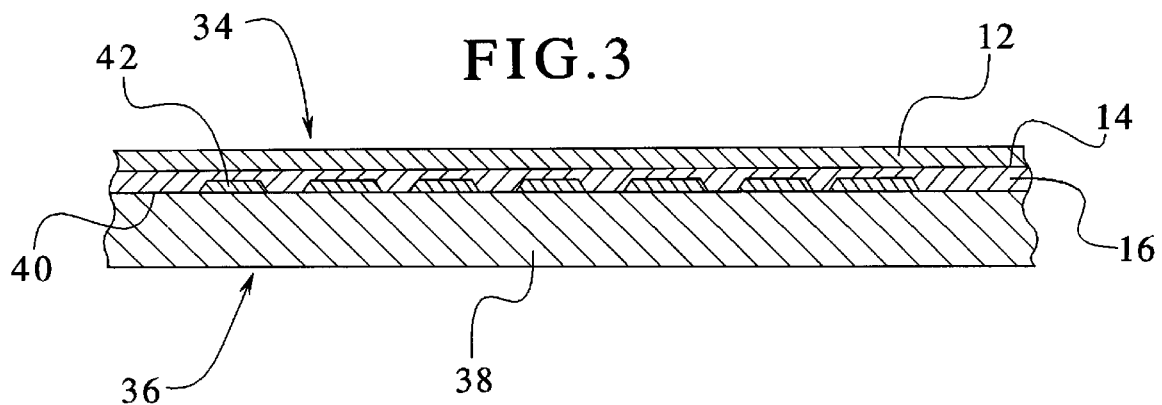
FIG. 3 is an elevated cross-sectional view showing a new and improved thermal laminate assembly in accordance with the present invention.

Referring now to FIG. 3, a new and improved thermal laminating assembly in accordance with the present invention, generally referred to by reference numeral 34, is shown. The thermal laminate assembly 34 comprises a printed substrate 36 including a substrate layer 38 having a surface 40 and printed ink 42 disposed imagewise on surface 40. The new and improved thermal laminating film 10 is thermally laminated onto the printed surface 40 of the substrate so that the protective thermoplastic polymer sheet layer 12 and the thermal laminating layer 16 are intimately contacted and bonded to the printed surface 40 of the substrate 38. In accordance with the present invention, the new and improved thermal laminating film 10 is capable of being directly used in conventional thermal laminating equipment to satisfactorily thermally laminate the new and improved thermal lamination films onto special digitally printed sheets or substrates such as 36 including those having siliconized inked surfaces or glycol formulated ink surfaces, as shown in FIG. 3.

Referring now to FIG. 4, a method for making the thermal laminate assembly 34, shown in FIG. 3, is depicted. The thermal laminate 34 may be prepared in commercially available equipment such as a Genesis 8300™, Falcon™ or Orca™ brand thermal laminator available from General Binding Corporation, Film Products Division, Addison, Ill. The sequence of steps for performing the thermal laminating method, using this commercially available equipment, is depicted in the sequence of steps shown in FIGS. 4a through 4d. More particularly, as shown in FIG. 4a, a printed substrate 36 to be laminated is fed into the laminating equipment 44 to a positive stop in a thermal lamination station 46. Thereafter, as depicted in FIG. 4b, the thermal laminating film 10 is moved relative to the printed substrate 36 and positioned in the laminating station 46 so that the thermal laminating film 10 is disposed in overlying registering relation to the printed substrate 36 and so that the thermal laminating layer 16 is disposed in face to face contact with the printed surface 40 of the substrate 38 to form a pre-assembly 48. Thereafter, as depicted in FIGS. 4C and 4D, the pre-assembly 48 is subjected to conditions of elevated temperature and pressure by means of applying a heated roller 50, heated by hot water, along the entire length of the pre-assembly 48. Typical thermal lamination temperatures are from about 210° to 285° F. The heated rollers are usually heated by water. The inwardly directed pressures provided by rollers 50, compressing the pre-assembly 48, typically range from about 50 to about 70 pounds per lineal inch. When pre-assembly 48 is passed through the heated rollers 50, the thermal laminating layer 16 rapidly melts and effectively bonds the thermoplastic polymer film 12 to the printed surface 40 of the substrate 38.

A major advantage provided by the new and improved thermal laminating film 10, of this invention, is that it melts at a temperature of about 175°, this permits lower thermal lamination temperatures, to be used, which provides special advantages with respect to polycarbonate plastic sheets used as the protective layer 12. Polycarbonate starts to soften at temperatures of about 200° F. which is close to its heat distortion temperature. Polycarbonate frequently waffles in thermal lamination, which is a distinct disadvantage. A major advantage provided by this invention, with its lower processing temperatures, is that polycarbonate protective layers may be used and exposed to lower temperature processing conditions so that the incidence of waffling or other heat distortion anomalies can be reduced or avoided.

Further advantages provided by the present invention will become apparent from the following working examples.

EXAMPLE 1

In the following Example, a thermal laminating film, in accordance with the present invention, was prepared and tested for physical and chemical properties. More particularly, a base thermoplastic polymer sheet layer comprising an oriented polyester sheet having a thickness of 11 microns was employed. A thermal laminating layer was extruded onto the surface of the polyester substrate to a coating thickness of about 15 microns using commercially available Black and Clawson equipment. The composition of the thermal laminating layer co-extruded onto the surface of the polyester sheet was as follows:

| | |
|---|---|
| Polymer A | 90% by weight-an ethylene vinyl acetate copolymer containing 28% by weight vinyl acetate content. |
| Polymer B | 9% by weight-low molecular weight polyethylene having a melt index of 30. |
| Additive | 1% by weight of a blend of Tinuvin ® in EVA (16% VA) comprising 98% polymer. |

The thermal laminating film thus prepared was thermally laminated using commercially available thermal lamination equipment onto a printed paper substrate to form a thermal laminate assembly. The thermal laminate assembly was tested in accordance with standard test methods to determine the bond strength and optical properties. The ASTM methods used were D1876-95 and D1003, respectively.

In accordance with the standardized bond strength testing, the peel strength of adhesion of the thermal laminating film to the substrate in the thermal laminate assembly was measured. From the results of these studies it was found that the interlayer bonding strength between the ethylene vinyl acetate thermal laminating layer and the corona treated and primer treated thermoplastic polyester base layer was about 8 pound per inch. The bond strength of the thermal laminating film to the printed substrate surface caused a destruction of the paper itself, meaning that the adhesive strength was stronger than the cohesive strength of the paper substrate.

The optical properties were also measured in accordance with standard testing procedures. The haze was 2.0% and the gloss was 95.0% indicating that the new and improved thermal laminating film, in accordance with the present invention exhibits very good thermal laminating properties.

EXAMPLE 2

In the following Example, the use of a thermal laminating film containing a thermal laminating layer containing an ethylene vinyl acetate copolymer containing 28% vinyl acetate on new 100% solid thermal inks was compared, in terms of bond strength, to a conventional thermal laminating film containing a thermal laminating layer with an ethylene vinyl acetate copolymer containing 18% vinyl acetate content. From the results of these studies, it was discovered that the new and improved thermal laminating film, of the present invention, provides satisfactory bond strength such that it can be used for a book cover, whereas the more conventional 18% film had a bond strength which was unacceptable for this purpose.

In accordance with this study, thermal laminate assemblies employing the 18% EVA and the 28% EVA blend thermal laminating film were prepared on conventional thermal laminating equipment. The thermal laminating films were applied to substrates having a surface printed with 100% solid thermal inks. The bond strength of the final thermal laminate assembly was tested in accordance with standard ASTM testing methods. The solid inks used and the results obtained are set forth in Table 1 as follows:

TABLE 1

| Thermal laminating film bond strengths through color prints using 100% solid thermal inks. | | | |
|---|---|---|---|
| COLOR | 18% EVA | 28% EVA | % DIF |
| yellow | 1.25 lb/inch | 2.12 lb/inch | +69.6% |
| black | .94 lb/inch | 1.94 lb/inch | +106.4% |
| orange | .87 lb/inch | 2.00 lb/inch | +129.9% |
| red | .50 lb/inch | 1.43 lb/inch | +186% |
| green | 1.69 lb/inch | 2.50 lb/inch | +48% |
| magenta | .625 lb/inch | 1.37 lb/inch | +120% |

The results of Table 1 indicate that the new and improved thermal laminating films in accordance with the present invention employing ethylene vinyl acetate copolymers containing 28% or more ethylene vinyl acetate provide satisfactory bond strengths to color printed substrates printed with 100% solid thermal inks whereas a more conventional thermal laminating film employing an ethylene vinyl acetate copolymer containing 18% by weight vinyl acetate content was unacceptable.

EXAMPLE 3

In the following Example, a thermal laminating film was prepared in accordance with the method of Example 1 except that the thermal laminating layer comprised as Polymer A, 85% by weight of an ethylene vinyl acetate copolymer containing 28% by weight vinyl acetate content and as Polymer B about 15% by weight of an ethylene vinyl acetate copolymer containing 9% by weight of vinyl acetate content. The thermal laminating film was prepared by co-extruding the composition of this thermal laminating film layer onto a thermoplastic polymer sheet. The thermal laminating film was then thermally laminated using conventional thermal lamination equipment onto a printed substrate and satisfactory bond strengths and optical properties were obtained.

| Polymer A | 85% EVA 28% vinyl acetate content. |
|---|---|
| Polymer B | 15% EVA 9% vinyl acetate content. |

Although the present invention has been defined by reference to certain preferred embodiments, modifications or changes may be made therein by those skilled in this art.

For example, the printed substrates to be laminated may comprise paper, cardboard, metal or synthetic substrate materials, e.g. polyester printing sheets. Although the thermal lamination films have been described as especially well suited for use with glycol-based inks, 100% solids inks and siliconized ink surfaces, they may also be used generally with any other printed inks or substrate materials. Other conventional additives may be incorporated in their conventionally employed amounts in the thermal laminating layers and the thermal lamination films may comprise other conventional layers or surface treatments. All such obvious modifications may be made herein by those skilled in the art without departing from the scope or spirit of the present invention, as defined by the appended claims.

I claim:

1. A thermal laminating film comprising:
   a base layer of a thermoplastic polymer sheet material having a surface, and a
   unitary thermal laminating layer disposed on the surface, the unitary thermal laminating layer comprising from about 60% to about 90% by weight of an ethylene vinyl acetate, copolymer containing from about 28% to about 40% by weight of vinyl acetate units, and an amount of an anti-blocking agent effective, when the thermal laminating film is wound on a roll, to prevent the thermal laminating film from sticking to roller surfaces, from fusing along an edge portion thereof, or from blocking upon slitting.

2. A thermal laminating film as defined in claim 1, wherein the base layer comprises a thermoplastic polymer sheet material selected from the group consisting of oriented polypropylene, non-oriented polypropylene, polyester, polyamide, polyvinyl chloride and polycarbonate.

3. A thermal laminating film as defined in claim 1, wherein the thermal laminating layer comprises from about 5 to about 40% by weight of said anti-blocking agents.

4. A thermal laminating film as defined in claim 1, wherein said anti-blocking agent comprises a low molecular weight polyethylene having a melt index of about 30.

5. A thermal laminating film as defined in claim 1, wherein said anti-blocking agent comprises an ethylene vinyl acetate copolymer having a vinyl acetate content of 10% by weight or less.

6. A thermal laminating film as defined in claim 1 having a total film thickness of from about 15 to about 300 microns.

7. A thermal laminating film as defined in claim 1, wherein said base layer has a thickness of from about 0.001 to about 0.010 inches.

8. A thermal laminating film as defined in claim 1, wherein said thermal laminating layer has a thickness of from about 0.0003 to about 0.005 inches.

9. A thermal laminating film as defined in claim 1, wherein said thermal laminating layer further comprises an ultraviolet absorber.

10. A thermal laminate assembly comprising:
    a printed substrate including a surface with printed ink disposed imagewise on the surface of the substrate; and
    a protective thermoplastic polymer layer thermally laminated to the surface with a thermal laminating layer disposed between the protective layer and the surface, said thermal laminating layer comprising from about 60 to about 90% by weight of an ethylene vinyl acetate copolymer containing from about 28% to about 40% by weight of vinyl acetate units and from about 5 to about 40% by weight of an anti-blocking agent.

* * * * *